United States Patent
Seo

(10) Patent No.: US 10,302,319 B2
(45) Date of Patent: May 28, 2019

(54) STORAGE TANK WITH CONDENSER

(71) Applicants: HYUNDAI MOTOR COMPANY, Seoul (KR); KIA MOTORS CORPORATION, Seoul (KR)

(72) Inventor: Jung Min Seo, Gwangmyeong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/633,217

(22) Filed: Jun. 26, 2017

(65) Prior Publication Data
US 2018/0163979 A1    Jun. 14, 2018

(30) Foreign Application Priority Data
Dec. 14, 2016    (KR) .................. 10-2016-0170210

(51) Int. Cl.
*F24F 5/00*    (2006.01)
*F25D 17/02*    (2006.01)
(Continued)

(52) U.S. Cl.
CPC ............ *F24F 5/0017* (2013.01); *F25B 39/04* (2013.01); *F25D 17/02* (2013.01); *F28D 1/0213* (2013.01);
(Continued)

(58) Field of Classification Search
CPC . F24F 5/0017; F24F 5/00; F25B 39/04; F25B 2339/046; F25B 2339/047; F25D 17/02; F28D 1/0213; F28D 1/035; F28D 20/0034; F28D 20/02; F28D 2020/0078; F28D 2021/007; F28D 2021/0084; F28F 1/22; F28F 9/0253
(Continued)

(56) References Cited

U.S. PATENT DOCUMENTS 4,201,262 A * 5/1980 Goldstein ................. F28D 3/04
165/117
4,492,186 A    1/1985 Helm
(Continued)

FOREIGN PATENT DOCUMENTS

DE       37060527 A1    8/1988
JP        5896484 B2    3/2016
KR     10-0925816 B1   11/2009

OTHER PUBLICATIONS

Non-Final Office Action issued in related U.S. Appl. No. 15/612,055 dated Jan. 2, 2019.

*Primary Examiner* — Joseph F Trpisovsky
(74) *Attorney, Agent, or Firm* — Morgan Lewis & Bockius LLP

(57) ABSTRACT

A storage tank includes a condenser, a tank body having a storage space for storing a liquid phase working fluid, and a condenser core disposed in an interior of the tank body, wherein the tank body includes an upper body and a lower body, wherein a support plate is horizontally arranged within the upper body, wherein the condenser core includes a plurality of core elements, wherein each of the plurality of core elements includes upper end coupled to the upper body, lower end coupled to the support plate, and rear end coupled to a support member, wherein the support member extends to cross the upper body in a widthwise direction of the upper body.

14 Claims, 15 Drawing Sheets

(51) Int. Cl.
  *F28D 20/02* (2006.01)
  *F28F 1/22* (2006.01)
  *F25B 39/04* (2006.01)
  *F28F 9/02* (2006.01)
  *F28D 1/03* (2006.01)
  *F28D 20/00* (2006.01)
  *F28D 1/02* (2006.01)
  *F25B 13/00* (2006.01)
  *F25D 1/00* (2006.01)
  *F28D 21/00* (2006.01)

(52) U.S. Cl.
  CPC ......... *F28D 1/035* (2013.01); *F28D 20/0034* (2013.01); *F28D 20/02* (2013.01); *F28F 1/22* (2013.01); *F28F 9/0253* (2013.01); *F24F 5/00* (2013.01); *F25B 13/00* (2013.01); *F25B 2339/046* (2013.01); *F25B 2339/047* (2013.01); *F25D 1/00* (2013.01); *F28D 2020/0078* (2013.01); *F28D 2021/007* (2013.01); *Y02E 60/142* (2013.01); *Y02E 60/147* (2013.01)

(58) Field of Classification Search
  USPC .............................................. 62/77
  See application file for complete search history.

(56) References Cited

U.S. PATENT DOCUMENTS

| | | |
|---|---|---|
| 4,905,900 A | 3/1990 | Scharton et al. |
| 4,966,230 A | 10/1990 | Hughes et al. |
| 7,044,207 B1 | 5/2006 | Guidat et al. |
| 8,596,339 B2 | 12/2013 | Palanchon |
| 2009/0277606 A1 | 11/2009 | Reiss, III et al. |
| 2012/0117989 A1* | 5/2012 | Turney ............ F25B 45/00 62/115 |
| 2013/0244077 A1 | 9/2013 | Palanchon et al. |
| 2014/0017545 A1 | 1/2014 | Palanchon |
| 2014/0076528 A1* | 3/2014 | Daly .............. F03B 13/00 165/166 |
| 2014/0373798 A1 | 12/2014 | Alfano et al. |

\* cited by examiner

STORAGE TANK WITH CONDENSER

CROSS-REFERENCE TO RELATED APPLICATION

This application is based on and claims the benefit of priority to Korean Patent Application No. 10-2016-0170210, filed on Dec. 14, 2016 with the Korean Intellectual Property Office, the disclosure of which is incorporated herein in its entirety by reference.

TECHNICAL FIELD

The present disclosure relates to a storage tank with a condenser, and more particularly, to a storage tank with a condenser in which the condenser is disposed in the interior of the storage tank so that the volume and the weight of the storage tank may be reduced.

BACKGROUND

A storage tank may be disposed on a downstream side of a condenser in a working fluid conduit of a working fluid cycle, such as a refrigeration cycle or a Rankine cycle, of a waste heat recovery system, and a liquid phase working fluid condensed by the condenser may be stored in the storage tank. A pump for circulating a fluid may be disposed on a downstream side of the storage tank.

The condenser, the storage tank, and the pump may be installed in a section where the liquid phase fluid is present, the condenser may be disposed above the storage tank, and the storage pump may be disposed above the pump. That is, a pressure loss may be reduced by disposing the condenser, the storage tank and the pump along a gravitational, or vertical, direction, and the liquid phase working fluid may be collected in the storage tank due to the weight thereof even when the working fluid cycle is stopped.

The storage capacity of the storage tank has to be considered based on the arrangement and capacity of the heat exchanger (an evaporator, a boiler and a condenser) of the working fluid cycle. Further, the storage capacity of the storage tank may be set in consideration of the amount of fluid filled in the condenser and the conduit when the cycle is operated and of a basic capacity for circulation of the cycle.

The working fluid may be present only in a liquid phase in a portion of the whole section of the working fluid cycle, but the phase of the working fluid may be changed based on the operation of the working fluid cycle at the remaining portions of the working fluid cycle. For example, the working fluid may be present in a liquid phase in an air boiler or a recuperator of a Rankine cycle of a waste heat recovery system, and may be present in a combination of a liquid phase and a vapor phase in an EGR gas boiler, an exhaust gas boiler or a pipe.

Accordingly, the storage capacity of the storage tank may be a value obtained by adding the fixed capacity of the working fluid that is always present in a liquid phase and a variable capacity of the working fluid varied, or present, through a phase change.

However, because the percentage of the fixed capacity in the storage tank is very large, the volume of the storage tank has to be larger regardless of an operational state of the working fluid cycle. Accordingly, a required installation space of the working fluid cycle may be large.

Further, because the storage tank has to be designed as a pressure-resistant container based on the type of the working fluid, the weight of the storage tank may become excessive.

SUMMARY

The present disclosure provides a storage tank with a condenser in which a condenser, a percentage of a variable capacity is large, is disposed in the interior of the storage tank so that the volume and weight of the storage tank may be reduced.

The technical objects of the present disclosure are not limited to the above-mentioned one, and the other unmentioned technical objects will become apparent to those skilled in the art from the following description.

In accordance with an aspect of the present disclosure, there is provided a storage tank with a condenser including a tank body having a storage space for storing a liquid phase working fluid, and a condenser core installed in the interior of the tank body.

The condenser core may be installed in an upper area of the storage space of the tank body.

A support plate configured to support the condenser core may be provided in the storage space of the tank body.

A water level sensor configured to detect a water level may be installed in the tank body.

In accordance with an aspect of the present disclosure, there is provided a storage tank with a condenser including a tank body having a storage space for storing a liquid working fluid, a header installed in the tank body, and a condenser core connected to the header and installed in the interior of the tank body.

The condenser core may include a plurality of core elements, each of which has a coolant passage, through which a coolant circulates, and the plurality of core elements are spaced apart from each other at a specific interval such that working fluid passages are formed between the adjacent core elements.

The header may include a coolant inlet manifold connected to inlets of the coolant passages of the core elements to communicate the coolant passages of the core elements, a coolant outlet manifold connected to outlets of the coolant passages of the core elements to communicate the coolant passages of the core elements, and a working fluid inlet manifold connected to the working fluid passages to communicate with the working fluid passages.

Each of the core elements may include a pair of opposing half shells, and each of the half shells has a groove for forming the corresponding coolant passage.

The tank body may have an opening, into which the condenser core is inserted.

The header may close to the opening of the tank body to seal the opening.

a working fluid distribution chamber may be formed in the interior of the working fluid inlet manifold, and the working fluid distribution chamber may communicate with the working fluid passages.

The header may have a plurality of communication apertures communicating the working fluid distribution chamber, and the communication apertures may individually communicate with the working fluid passages.

A coolant inlet chamber may be formed in the interior of the coolant inlet manifold, and the coolant inlet chamber may communicate with inlets of the core elements.

A coolant outlet chamber may be formed in the interior of the coolant outlet manifold, and the coolant outlet chamber may communicate with outlets of the core elements.

Upper and lower ends of the core elements may be coupled to the tank body, and front ends of the core elements may be coupled to the header.

Rear ends of the core elements may be coupled to a support member, the support member may extend in a transverse direction of the tank body, and opposite ends of the support member may be coupled to the tank body.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings. For reference, the sizes of the components and the thickness of the lines of the drawings may be exaggerated for convenience of understanding. Further, the terms used in the description of the present disclosure may be different according to the users, the intentions of the operators, or the customs in consideration of the functions in the present disclosure. Therefore, definition of the teens should be made according to the overall disclosure set forth herein.

Figure 1:
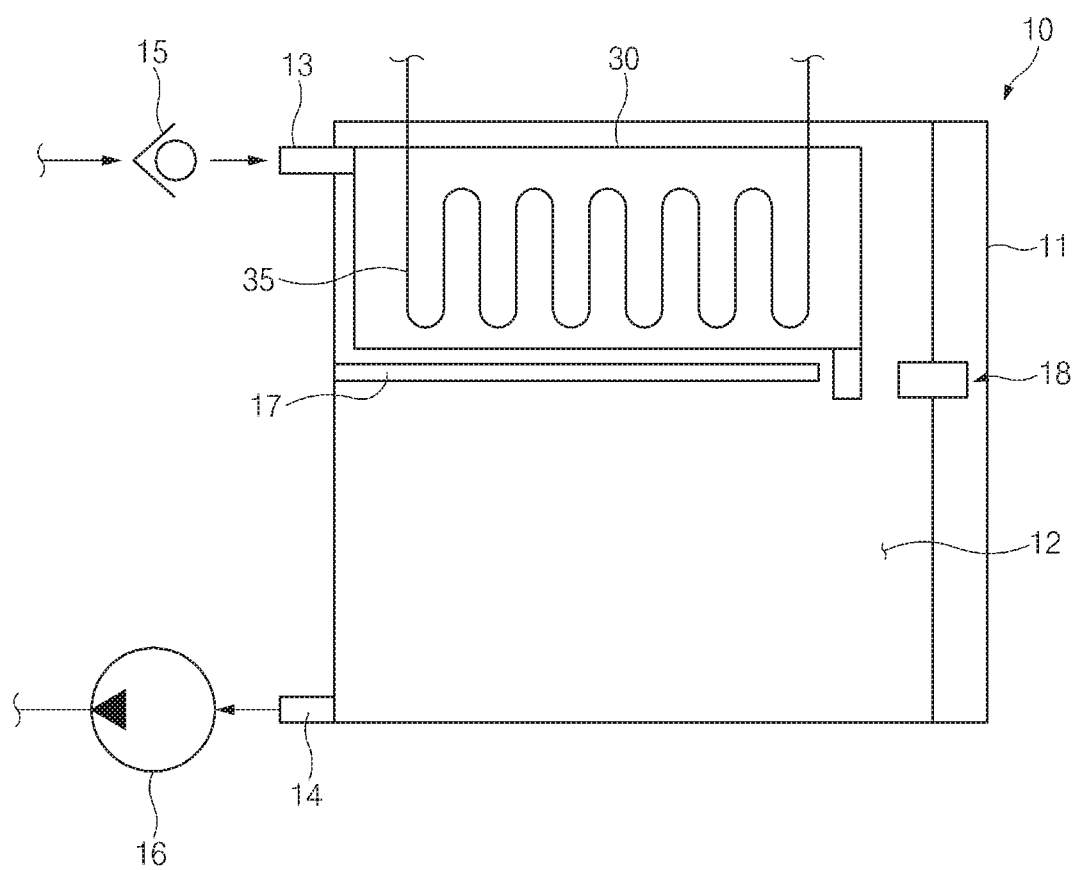
FIG. 1 is a diagram illustrating a storage tank with a condenser according to exemplary embodiments of the present disclosure.

Referring to FIG. 1, a storage tank with a condenser according to exemplary embodiments of the present disclosure may include a tank body 11, and a condenser core 30 installed in the interior of the tank body 11.

The tank body 11 may have a storage space 12 in which a liquid phase working fluid is stored, an inlet port 13, through which the working fluid is introduced, and an outlet port 14, through which the working fluid is discharged.

A check valve 15 may be installed on an upstream side of the inlet port 13 of the tank body 11, and a reverse flow of the working fluid may be prevented by the check valve 15.

A pump 16 may be installed on a downstream side of the outlet port 14 of the tank body 11, and the liquid phase working fluid in the storage tank 11 may be pumped by the pump 16.

A water level sensor 18 for detecting a water level may be installed inside or outside the tank body 11. The water level of the liquid phase working fluid measured by the water level sensor 18 based on an operation state of the working fluid cycle may be monitored as a whole.

The condenser core 30 may be installed in the interior of the tank body 11, and the condenser core 30 may be installed in an upper area of the storage space 12. The condenser core 30 may have a coolant passage 35, through which a coolant for condensing a working fluid circulates.

A support plate 17 for supporting the condenser core 30 may be provided in the storage space 12 of the tank body 11. The support plate 17 may have a length that is smaller than a length of the tank body 11.

Through the configuration, if a vapor phase working fluid is introduced into the tank body 11 through the inlet port 13, the vapor phase fluid may be cooled by the condenser core 30 and be condensed to a liquid phase working fluid, and the condensed liquid phase working fluid may be stored in the storage space 12 in the tank body 11. The liquid phase working fluid stored in the storage space 12 may be discharged from the outlet port 14 through an operation of the pump 16.

According to exemplary embodiments of the present disclosure, the inlet port 13 may be disposed at an upper end of the tank body 11, and the outlet port 14 may be disposed at a lower end of the tank body 11. Accordingly, if the vapor phase working fluid introduced through the inlet port 13 is condensed to a liquid phase working fluid by the condenser core 30, the liquid phase working fluid may naturally flow to a lower side of the tank body 11 due to the weight thereof.

Figure 2:
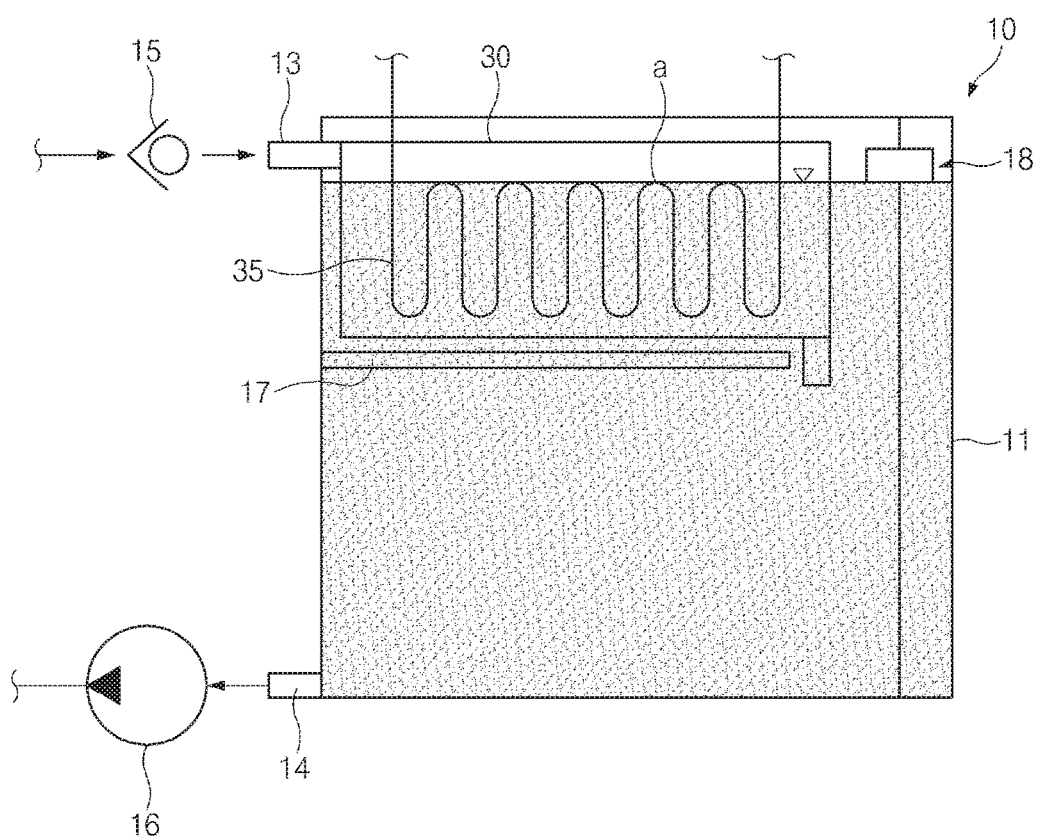
FIG. 2 is a view illustrating a state in which a liquid phase working fluid is stored in a storage tank before an operation of a fluid cycle according to exemplary embodiments of the present disclosure.

As illustrated in FIG. 2, before an operation of the working fluid cycle, the liquid phase working fluid may be stored such that the water level a of the liquid phase working fluid reaches an upper side of the storage space 12 of the tank body 11, that is, a part at which the condenser core 30 is disposed.

Figure 3:
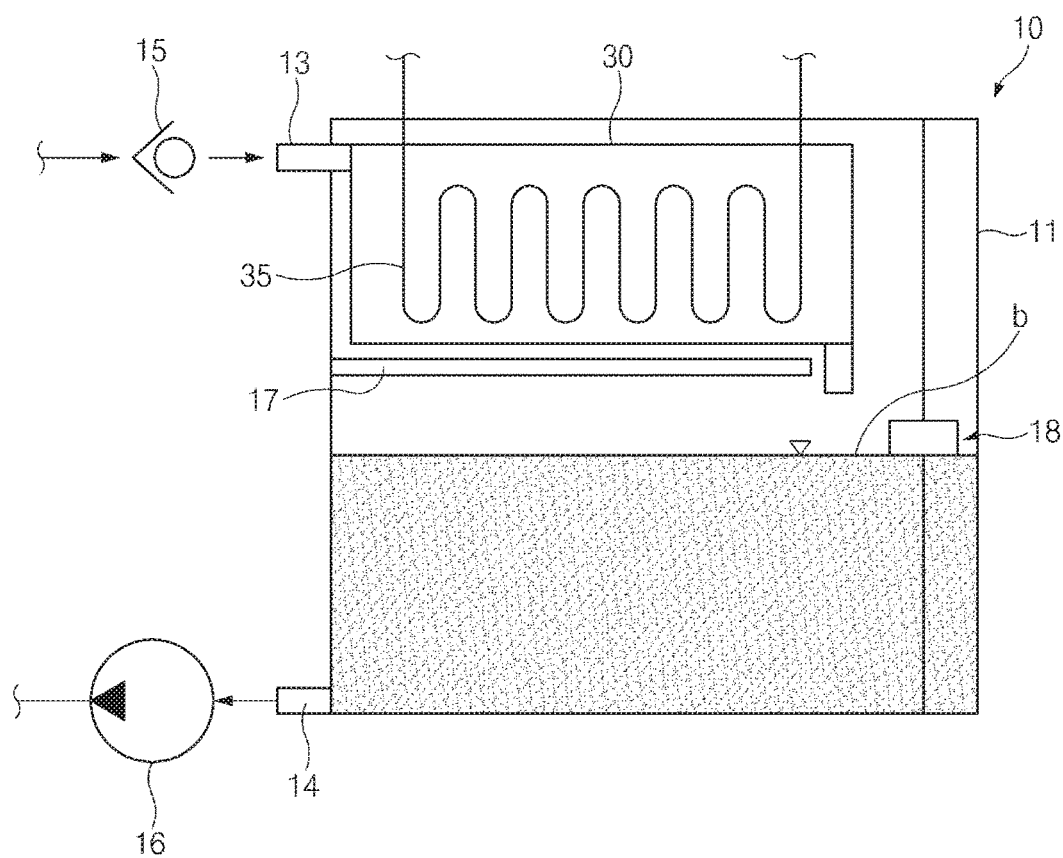
FIG. 3 is a view illustrating a state in which a liquid phase working fluid is stored in a storage tank during an operation of a fluid cycle according to exemplary embodiments of the present disclosure.
Figure 4:
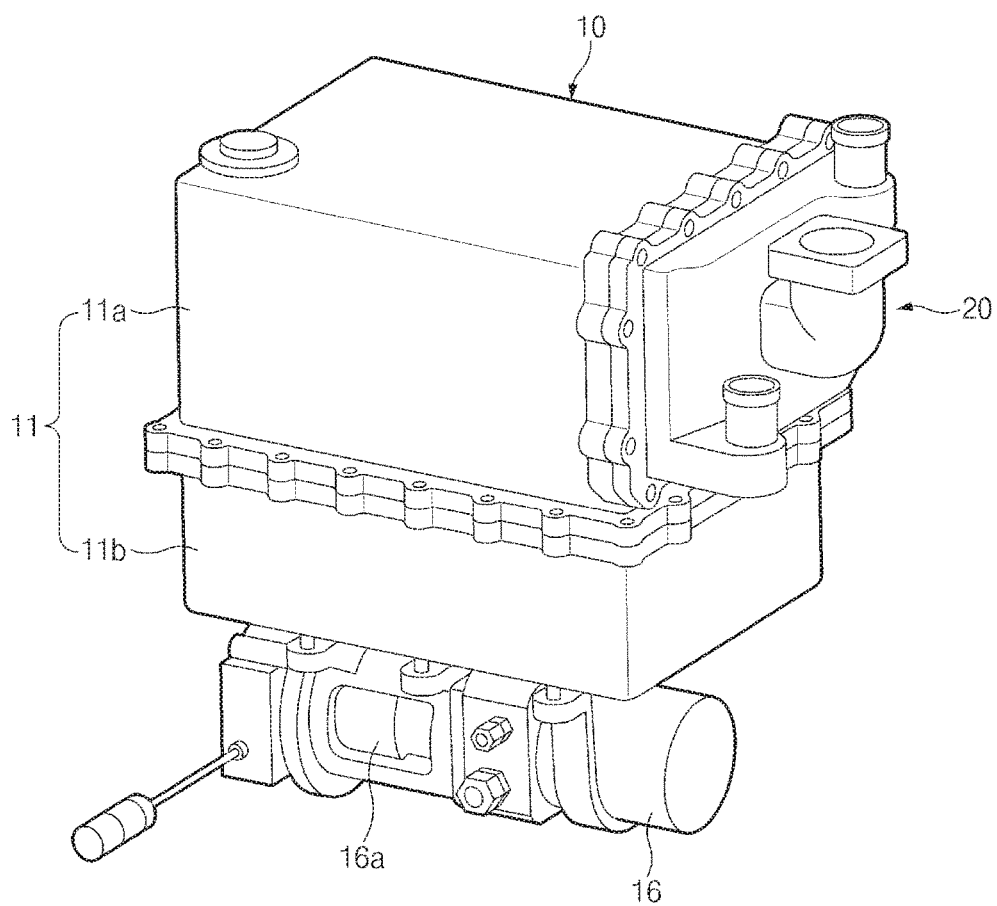
FIG. 4 is a perspective view illustrating a storage tank with a condenser according to exemplary embodiments of the present disclosure.

Further, as illustrated in FIG. 3, during an operation of the working fluid cycle, the liquid phase working fluid is pumped by an operation of the pump 16 such that the water level b of the fluid is lowered, and accordingly, an area in which the condenser core 30 contacts the liquid phase working fluid may be reduced or minimized and thus the condenser core 30 may effectively condense the vapor phase working fluid introduced into the tank body 11. For example, as the flow rate of the working fluid circulating in the working fluid cycle increases, the flow rate of the liquid phase working fluid stored in the storage space 12 of the tank body 11 decreases. Accordingly, an area in which the condenser core 30 does not contact the liquid phase working fluid increases and the required condensing performance may be satisfied.

Meanwhile, although a large installation space is required as the condenser and the storage tank are disposed independently according to the related art, the installation space of the condenser core 30 may become compact and the weight of the condenser core 30 may decrease as the condenser core 30 is disposed in the tank body 11 of the storage tank 10 according to exemplary embodiments of the present disclosure.

Further, according to the related art, the vapor phase working fluid that has not been sufficiently cooled in the condenser may be introduced into the storage tank, and accordingly, the vapor phase working fluid may be introduced into the pump, damaging the pump due to cavitation.

In contrast, because the vapor phase working fluid cannot be directly discharged through the outlet port 14 due to a difference between the vapor phase working fluid and the liquid phase working fluid as the condenser core 30 is disposed in an upper space of the storage tank 10, the inlet port 13 is disposed at an upper end of the tank body 11, and the outlet port 14 is disposed at a lower end of the tank body 11, the vapor phase working fluid may be prevented from being directly introduced.

Referring to FIGS. 4 to 12, the storage tank 10 with a condenser according to exemplary embodiments of the present disclosure may include a tank body 11, a header 20 installed on one side of the tank body 11 and a condenser core 30 installed in the interior of the tank body 11.

The tank body 11 may include an upper body 11a and a lower body 11b assembled with each other by using a coupling piece or through welding.

The support plate 17 may be horizontally arranged within the upper body 11a, and the condenser 30 may be supported by the support plate 17.

Figure 10:
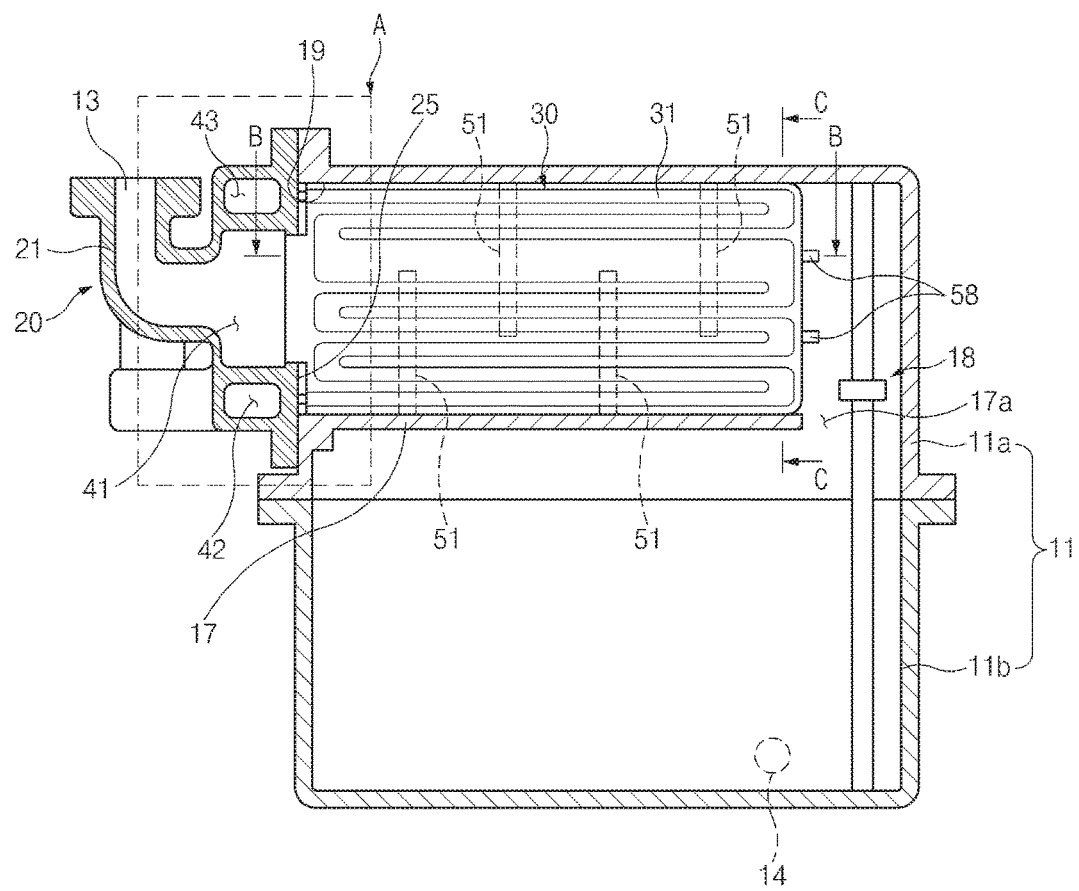
FIG. 10 is a perspective view illustrating a core element according to the embodiment of FIG. 7.

As illustrated in FIG. 10, a free end of the support plate 17 and an inner surface of the upper body 11a may be spaced apart from each other horizontally, and accordingly, an aperture 17a may be formed between the free end of the support plate 17 and the inner surface of the upper body 11a and thus the working fluid condensed by the condenser core 30 may smoothly flow to the lower body 11b through the aperture 17a.

As illustrated in FIG. 10, an opening 19 may be formed on one side of the upper body 11a, and the condenser core 30 may be inserted through the opening 19 and be installed in the interior of the tank body 11. The header 20 may be installed in the opening 19 of the upper body 11a to be sealed.

Figure 5:
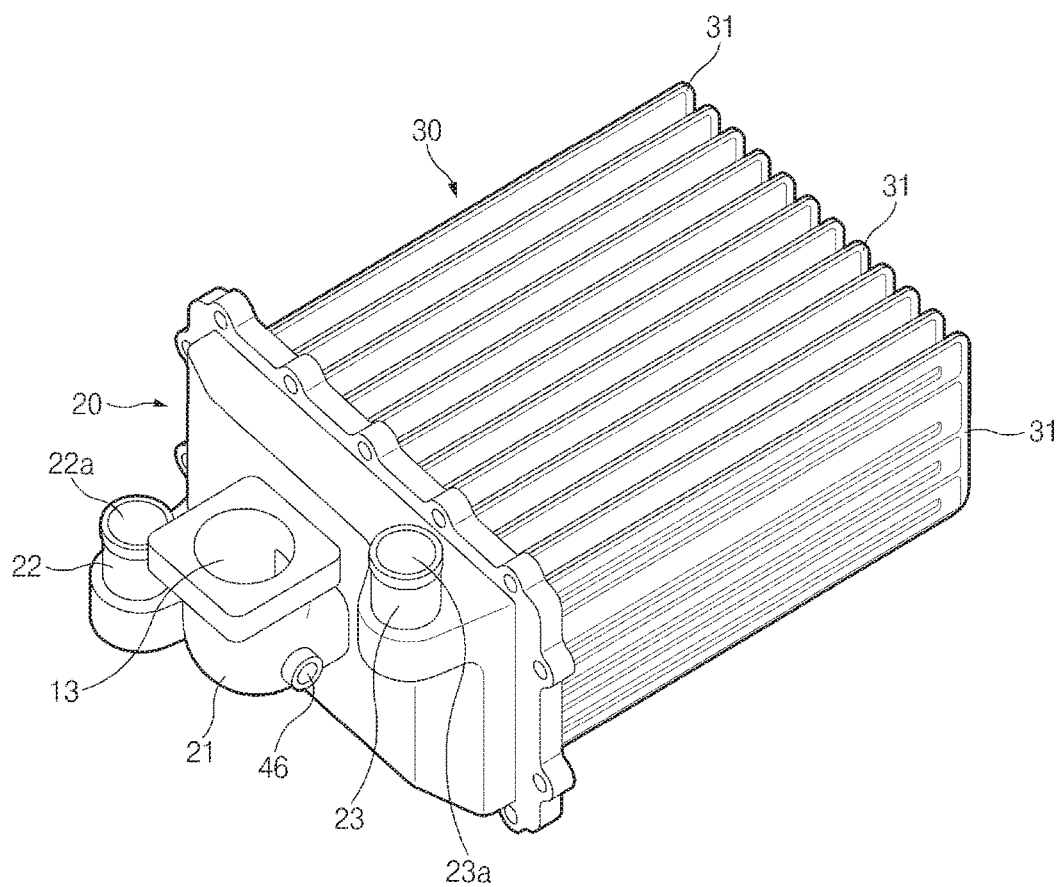
FIG. 5 is a perspective view illustrating a condenser core separated from a storage tank with a condenser according to exemplary embodiments of the present disclosure.
Figure 6:
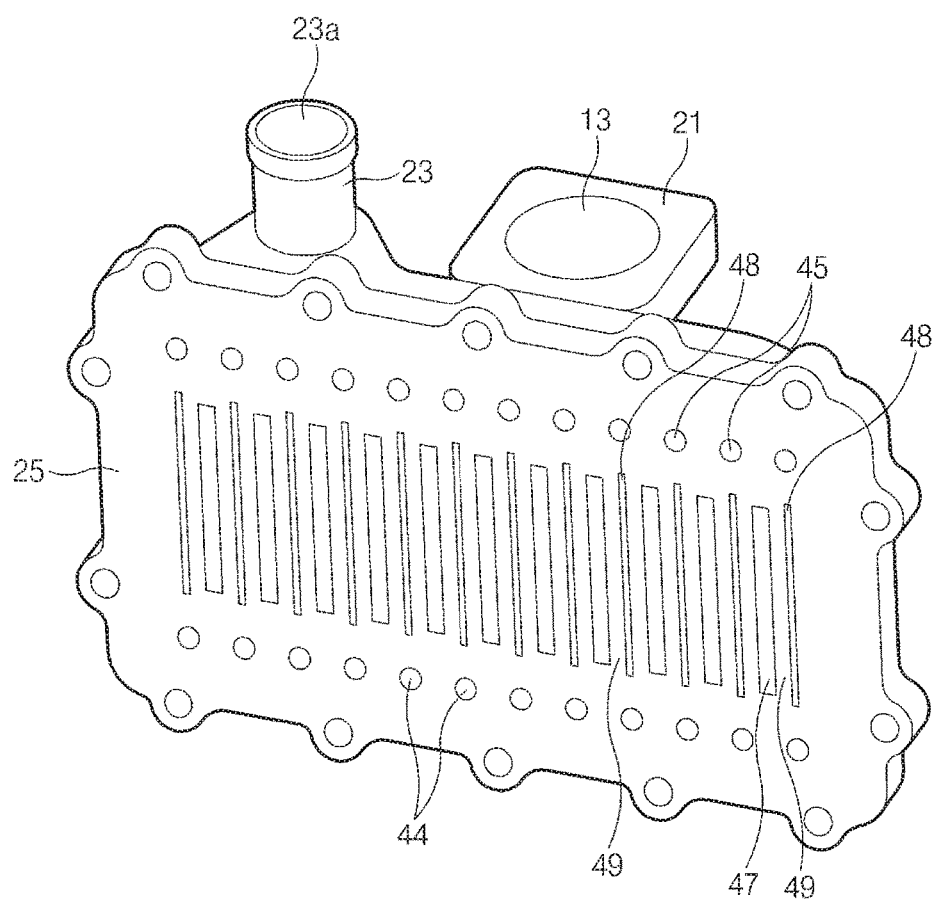
FIG. 6 is a perspective view illustrating a header separated from the condenser core of FIG. 5.

As illustrated in FIGS. 5 and 6, the header 20 may include a working fluid inlet manifold 21, a coolant inlet manifold 22, a coolant outlet manifold 23 and a back end wall to which the condenser core 30 is coupled.

The working fluid inlet manifold 22, the coolant inlet manifold 22, and the coolant outlet manifold 23 may be formed at a front portion of the header 20, a back end wall 25 may be formed at a back portion of the header 20, and the back end wall 25 may close the opening 19 of the tank body 11 such that the opening 19 of the tank body 11 may be sealed.

An inlet port 13, through which a fluid is introduced, may be formed at an end of the working fluid inlet manifold 22, and a working fluid distribution chamber 41 communicating with the inlet port 13 may be formed in the interior of the working fluid inlet manifold 21. Because the vapor phase working fluid may be preliminarily cooled by the coolant introduced into the coolant inlet manifold 22 of the header 20 as the working fluid distribution chamber 41 is provided in the header 20 together with the coolant inlet manifold 22 and the coolant outlet manifold 23, the condensation efficiency of the vapor phase working fluid may be improved.

A recovery port 46 may be formed on one side of the working fluid inlet manifold 21, and the recovery port 46 may communicate with the working fluid distribution chamber 41. For various reasons, possibly including safety, the recovery port 46 may be used when the working fluid is to be recovered from another component (an evaporator or a boiler) of the working fluid cycle to the storage tank 10. For example, for various reasons, possibly including safety, a high-temperature working fluid of the boiler (Rankine cycle) or a high-temperature refrigerant of the evaporator (refrigeration cycle) may have to be recovered. Meanwhile, according to the related art, because the temperature of the interior of the storage tank may increase due to the high-temperature working fluid if the high-temperature working fluid is recovered to the storage tank, and accordingly, as the internal pressure of the storage tank may increase, there is a high possibility of damaging the storage tank.

Meanwhile, according to exemplary embodiments of the present disclosure, because the high-temperature working fluid may be preliminarily cooled by the coolant introduced into the coolant inlet manifold 22 of the condenser core 30 when the high-temperature working fluid is recovered to the storage tank 10 as the recovery port 46 is formed on one side of the working fluid inlet manifold 21, the temperature and the pressure of the interior of the storage tank may remain constant.

As illustrated in FIG. 6, the back end wall 25 may be famed at a back portion of the header 20, and the back end wall 25 may close the opening 19 of the upper body 11a. A plurality of communication apertures 47 communicating with the working fluid distribution chamber 41 may be formed in the back end wall 25 of the header 20, and the plurality of communication apertures 47 may be spaced apart from each other along a horizontal direction. As illustrated in FIG. 6, the communication apertures 47 may extend from the back end wall 25 vertically, and the communication apertures 47 may individually communicate with working fluid passages 55 famed between the core elements 31. Accordingly, the vapor phase working fluid introduced through the inlet port 13 may pass through the plurality of working fluid passages 55 after being distributed to the plurality of communication apertures 47 through the working fluid distribution chamber 41.

Figure 7:
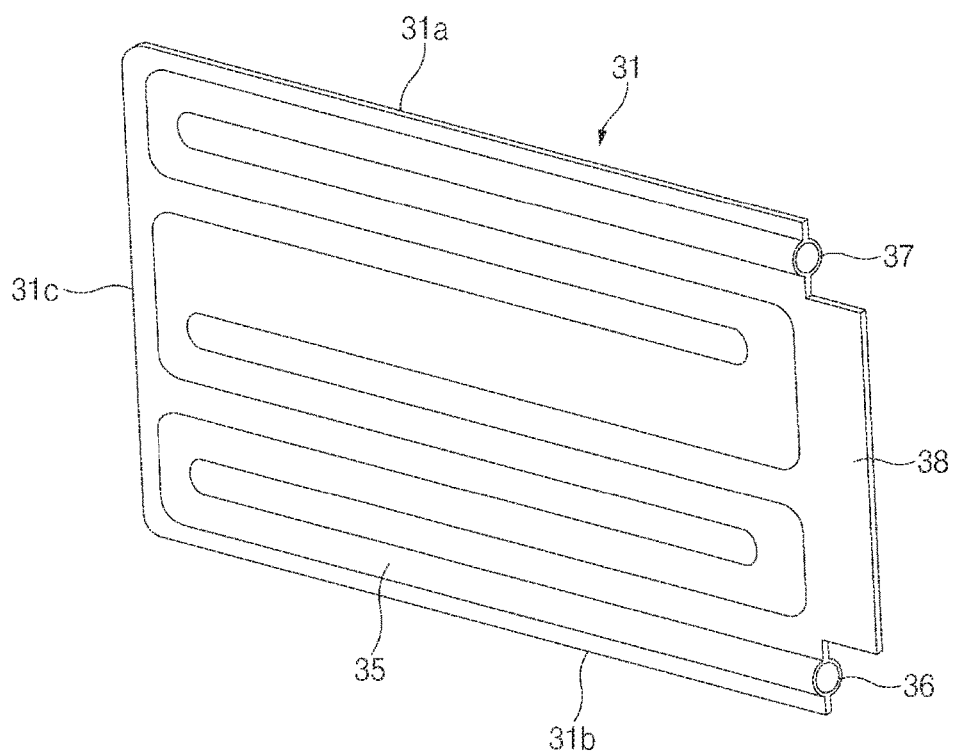
FIG. 7 is a perspective view illustrating a core element of the condenser core according to the embodiment of the present disclosure.
Figure 8:
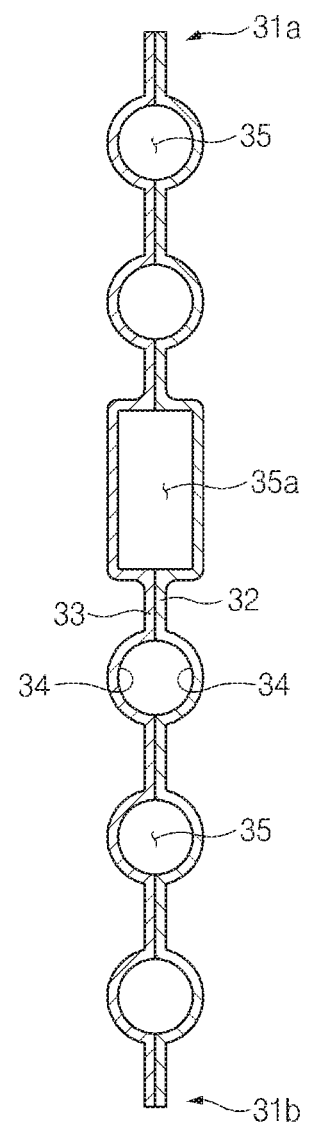
FIG. 8 is a cross-sectional view illustrating a core element of a condenser core according to exemplary embodiments of the present disclosure.
Figure 9:
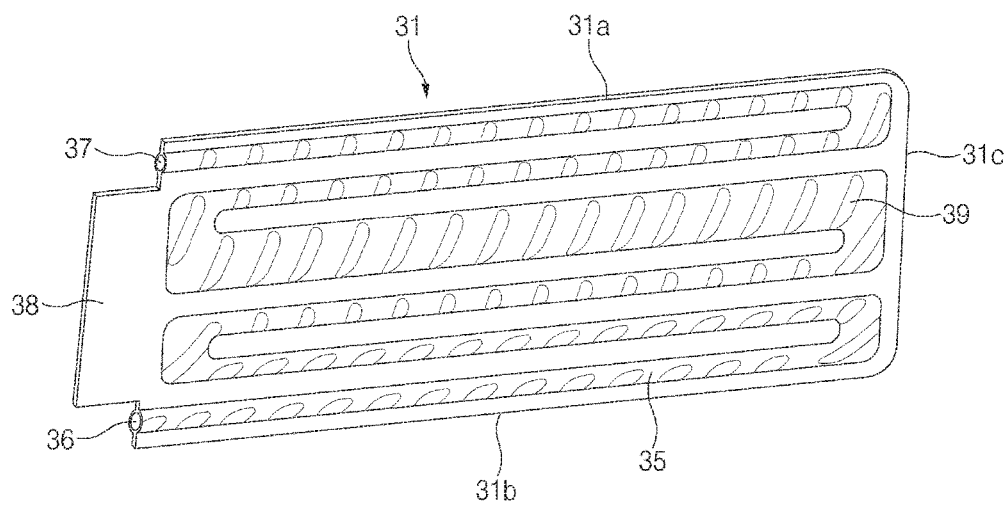
FIG. 9 is a perspective view illustrating a half shell on one side of a core element of a condenser core according to exemplary embodiments of the present disclosure.

As illustrated in FIGS. 6 to 12, as the plurality of communication chambers 47 are famed in the back end wall 25 and spaced apart from each other by a specific interval, a plurality of ribs 49 may be famed between the communication apertures 47. The plurality of ribs 49 may extend in a vertical direction. A plurality if insertion grooves 48 may be individually formed in the plurality of ribs 49, and accordingly, as illustrated in FIG. 9, the plurality of insertion grooves 48 and the plurality of communication apertures 47 may be alternately formed. The plurality of core elements 31 may be individually coupled to the plurality of insertion grooves 48. The insertion grooves 48 may extend in a vertical direction, and the plurality of insertion grooves 48 may be spaced apart from each other by a specific interval along a horizontal direction.

Figure 11:
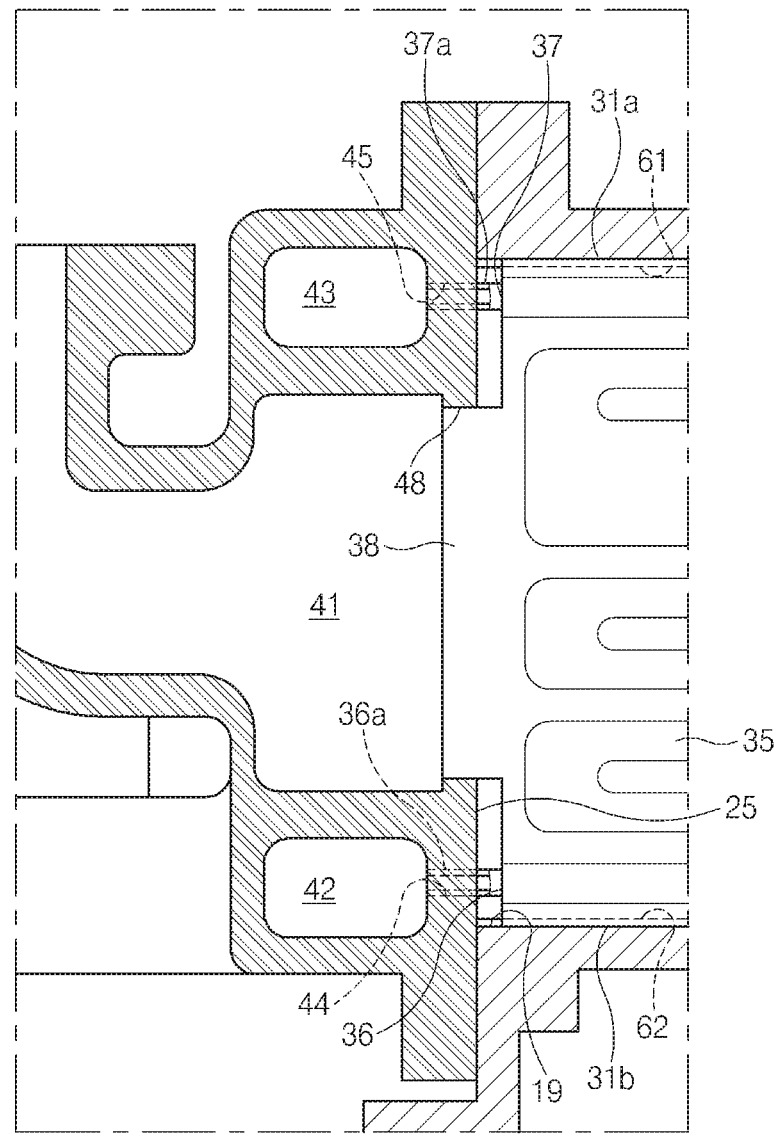
FIG. 11 is an enlarged cross-sectional view of area A of FIG. 10.

As illustrated in FIG. 5, an inlet port 22a, through which the coolant is introduced, may be formed at an end of the coolant inlet manifold 22. As illustrated in FIGS. 10 and 11, a coolant inlet chamber 42 communicating with the inlet port 22a may be famed in the interior of the coolant inlet manifold 22. As illustrated in FIGS. 6 and 11, a plurality of communication holes 44 communicating with the coolant inlet chamber 42 may be formed in the back end wall 25. Accordingly, after being distributed to the plurality of communication holes 44 through the coolant inlet chamber 42, the coolant introduced through the inlet port 22a may be introduced through the inlets 36 of the core elements 31, which will be described below.

As illustrated in FIG. 5, an outlet port 23a, through which the coolant is discharged, may be formed at an end of the coolant outlet manifold 23. As illustrated in FIGS. 10 and 11, a coolant outlet chamber 43 communicating with the outlet port 23a may be famed in the interior of the coolant outlet manifold 23. As illustrated in FIGS. 6 and 11, a plurality of communication holes 45 communicating with the coolant outlet chamber 43 may be formed in the back end wall 25.

Accordingly, the coolant discharged from the outlets 37 of the core elements 31, which will be described below, may be discharged through the outlet port 23a after being merged in the coolant outlet chamber 43.

The condenser core 30 may be connected to the header 20, and accordingly, the coolant may circulate in the interior of the condenser core 30.

The condenser core 30 may include a plurality of core elements 31 connected to the header 20.

Referring to FIGS. 7 and 8, each of the plurality of core elements 31 may include a coolant passage 35 in which the coolant, which cools and condenses the working fluid, circulates. The coolant passage 35 may be formed in a serpentine or reversing path, and accordingly, a heat exchange performance may be improved by enlarging a heat exchange contact area. The coolant passage 35 may have an inlet 36 communicating with the communication holes 44 of the coolant inlet manifold 22, and an outlet 37 communicating with the communication holes 44 of the coolant outlet manifold 23.

As illustrated in FIG. 11, the inlet 36 of the coolant passage 35 may be connected to the communication holes 44 of the coolant inlet chamber 42 through a connection piece 36a. The outlet 37 of the coolant passage 35 may be connected to the communication holes 45 of the coolant outlet chamber 43 through a connection piece 37a.

As the plurality of core elements 31 are spaced apart from each other by a specific interval, working fluid passages 55, through which the working fluid passes, may be faulted between the adjacent core elements 31, and the working fluid introduced through the inlet port 13 may be cooled by the coolant passing through the coolant passages 35 when the working fluid passes through the working fluid passages 55. Accordingly, the working fluid may be converted from a vapor phase to a liquid phase.

Figure 12:
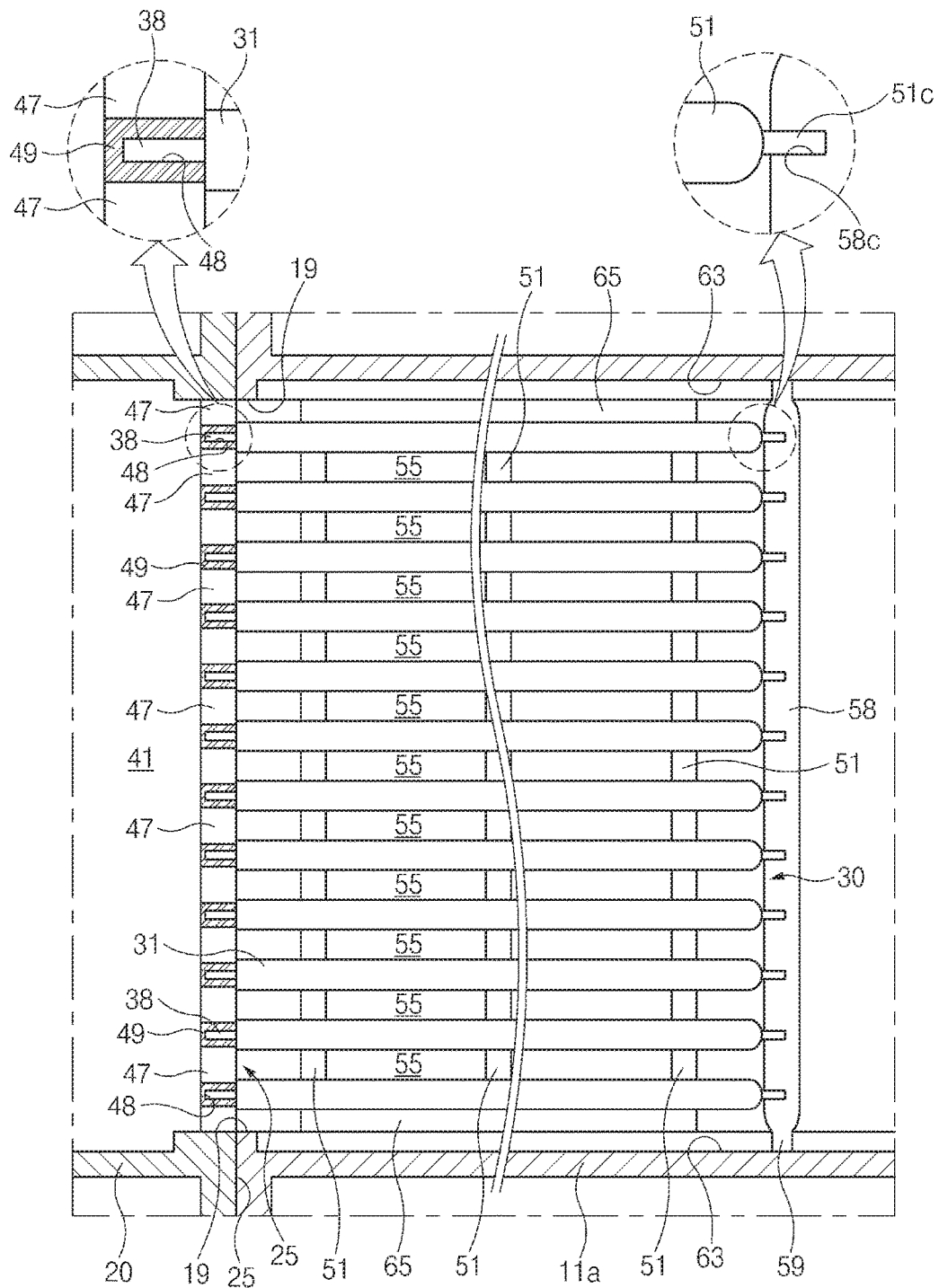
FIG. 12 is a cross-sectional view taken along line B-B of FIG. 10.

As illustrated in FIGS. 10 and 12, a plurality of baffles 51 may be interposed in the working fluid passages 55 between the core elements 31. The baffles 51 may prevent the core elements 31 from being distorted or deformed due to internal pressure and thermal deformation. As illustrated in FIG. 10, the plurality of baffles 51 may be disposed in zigzags when viewed from a side. Accordingly, the condensing efficiency may be improved as the working fluid flows in the zigzags.

Referring to FIGS. 7 and 8, each of the core elements 31 may include a pair of opposing half shells 32 and 33, and the pair of half shells 32 and 33 may be jointed, or joined, together through welding or the like. Each of the half shells 32 and 33 may have a groove 34 for forming a coolant passage 35.

According to exemplary embodiments of the present disclosure, the coolant passage 35 may have a circular section, and accordingly, the pressure-resistant performance of the coolant passage 35 may be improved.

According to exemplary embodiments of the present disclosure, the coolant passage 35a of a portion of the coolant passage 35 may have a flat rectangular cross-section and the rectangular cross-section may have rounded corners.

According to exemplary embodiments of the present disclosure, as illustrated in FIG. 9, a bead 39 having a specific shape may be formed on an outer surface of a portion at which the coolant passage 35 is formed. Accordingly, heat exchanger performance may be further improved.

An insertion portion 38 may be formed at a front end of each of the core elements 31, and the insertion portions 38 of the core elements 31 may be inserted into and coupled to the insertion grooves 48 of the header 20. Through this, as the plurality of core elements 31 are spaced apart from each other at a specific interval horizontally, the fluid passages 55 between the core elements 31 may remain constant.

Figure 13:
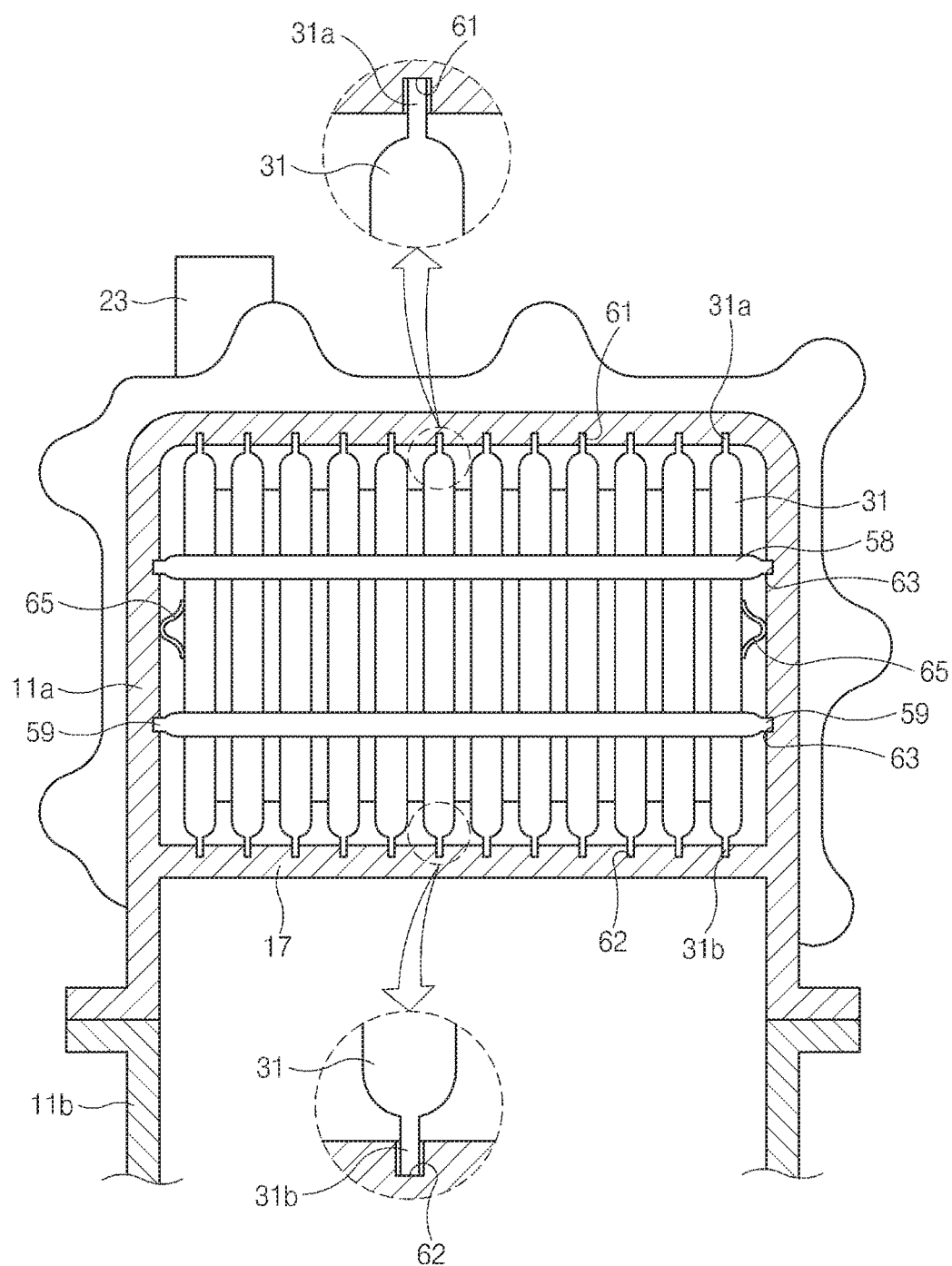
FIG. 13 is a cross-sectional view taken along line C-C of FIG. 10.

As illustrated in FIGS. 11 and 13, an upper end 31a of the core element 31 may be coupled to the upper body 11a. A plurality of first grooves 61 may be formed on the ceiling of the upper body 11a, and the first grooves 61 may extend along a longitudinal direction of the upper body 11a. Accordingly, the upper ends 31a of the core elements 31 may be inserted into and coupled to the first grooves 61.

As illustrated in FIGS. 11 and 13, a lower end 31b of the core element 31 may be detachably coupled to the support plate 17. A plurality of second grooves 62 may be famed on an upper surface of the support plate 17, and the second grooves 62 may extend along a longitudinal direction of the support plate 17. Accordingly, the lower ends 31b of the core elements 31 may be inserted into and coupled to the second grooves 62.

In this way, as front ends of the core elements 31 may be coupled to the header 20, upper ends of the core elements 31 are coupled to the upper body 11a, and lower ends of the core elements 31 are coupled to the support plate 17, the core elements 31 may be installed in the tank body 11 very stably.

Further, the rear ends 31c of the core elements 31 may be supported by a support member 58. The support member 58 may extend to cross the tank body 11 in a transverse direction of the upper body 11a, and the support member 58 may connect rear ends 31c of the core elements 31 in a transverse direction of the upper body 11a.

The support member 58 may have a plurality of grooves 58c spaced apart from each other by a specific interval, and the interval between the grooves 58c of the support member 58 may be the same as the interval between the core elements 31.

As the rear ends 31c of the core elements 31 are inserted into and coupled to the grooves 58c of the support member 58, the rear ends 31c of the core elements 31 may be connected to each other by the support member 58.

Opposite ends of the support member 58 may be detachably coupled to opposite inner surfaces of the upper body 11a, and the rear ends 31c of the core elements 31 may be stably supported to the upper body 11a through the support member 58.

In more detail, as illustrated in FIGS. 12 and 13, third grooves 63 may be formed on inner surfaces of the upper body 11a, and the third grooves 63 may extend in a longitudinal direction of the upper body 11a. Insertion portions 59 may be formed at opposite ends of the support member 58, and the insertion portions 59 of the support member 58 may be inserted into and coupled to the third grooves 63 of the upper body 11a.

Because the upper ends and the lower ends of the core elements 31 are coupled to the upper body 11a of the tank body 11 and the support plate 17, front ends of the core elements 31 are coupled to the header 20, and rear ends 31c of the core elements 31 are supported by the support member 58, the upper ends, the lower ends, and the front ends, the rear ends of the core elements 31 may be firmly supported to the tank body 11. Accordingly, the core elements 31 may be stably supported against vibration, pressure, and thermal deformation and thus the durability of the core elements 31 may be improved.

Further, because the upper ends 31a of the core elements 31, and the support member 58 are detachably coupled to the tank body 11, the core elements 31 may be easily separated from and assembled in the tank body 11. Accordingly, the interior space 11a of the tank body 11 and the core elements 31 of the condenser core 30 may be washed very easily.

Further, the core elements 31 may be elastically supported by two or more elastic members 65. As illustrated in FIGS. 12 and 13, the two or more elastic members 65 may be symmetrically installed on the inner surface of the tank body 11, and the elastic members 65 has a leaf spring structure extending in a longitudinal direction of the tank body 11. Accordingly, the core elements 31 may be elastically supported on opposite sides. The plurality of elements 31 may be more stably supported against pressure, vibration, and thermal deformation by the elastic elements 65.

Figure 14:
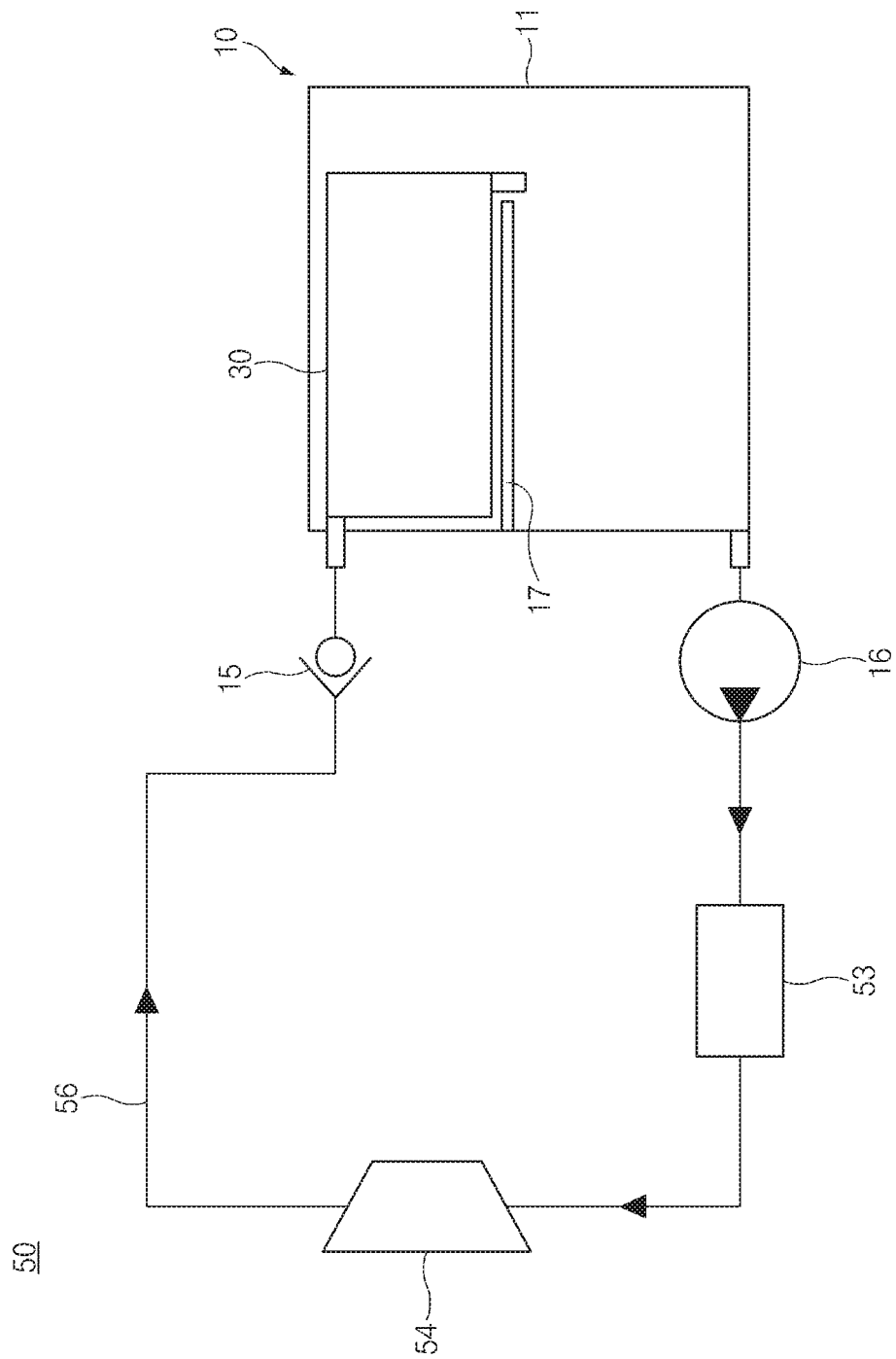
FIG. 14 is a view illustrating a structure in which a storage tank for a condenser according to exemplary embodiments of the present disclosure is applied to a Rankin cycle of a waste heat recovery system.

FIG. 14 is a view illustrating a structure in which the storage tank 10 with a condenser according to the present disclosure is applied to a Rankine cycle 50 of a waste heat recovery system for a vehicle.

According to the exemplary embodiment of FIG. 14, the storage tank 10 with a condenser may be applied to the Rankine cycle 50 of the waste heat recovery system.

Referring to FIG. 14, the Rankine cycle 50 may include a circulation path 56 along which a working fluid circulates, and a boiler 53 configured to heat and evaporate the working fluid by using waste heat (heat of exhaust gas and/or heat of EGR gas) of an engine, an expansion unit 54 configured to expand the working fluid received from the boiler 53 to generate rotational energy, a condenser core 40 configured to condense the working fluid discharged from the expansion unit 54, a storage tank 10 configured to store the working fluid condensed by the condenser core 30, a pump 16 installed on a downstream side of the storage tank 10 to circulate the working fluid, and the like are installed in the circulation path 51.

Through such an exemplary configuration, the liquid phase working fluid condensed by the condenser core 30 may be stored in the storage tank 10, and the liquid phase working fluid may be supplied to the boiler 53 through a pumping operation of the pump 16.

Figure 15:
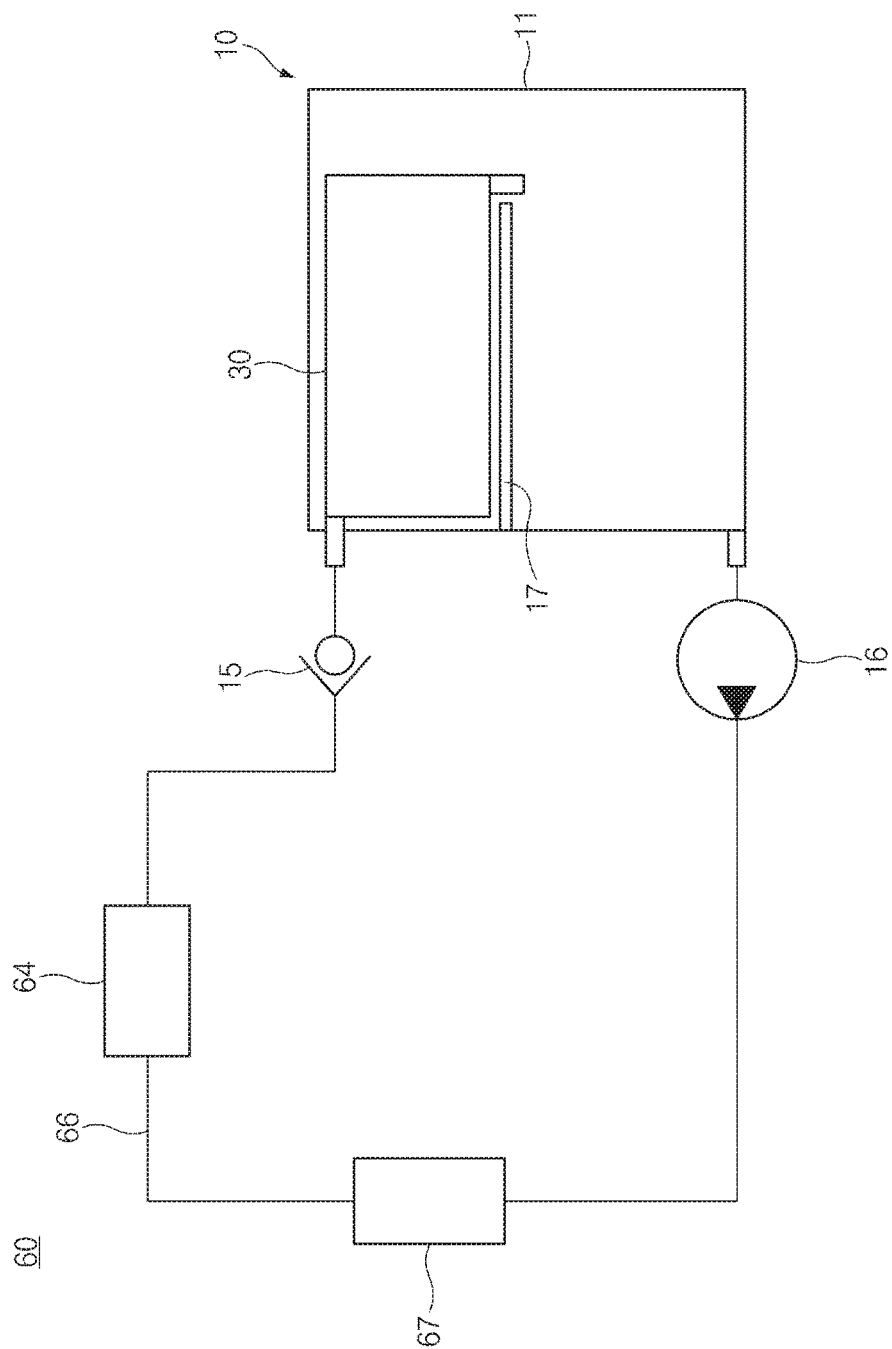
FIG. 15 is a view illustrating a structure in which a storage tank for a condenser according to exemplary embodiments of the present disclosure is applied to a Rankine cycle of a waste heat recovery system.

FIG. 15 is a view illustrating a structure in which the storage tank 10 with a condenser according to exemplary embodiments of the present disclosure is applied to a refrigeration cycle 60 having a pump.

According to the exemplary embodiment of FIG. 15, the storage tank 10 with a condenser may be applied to the refrigeration cycle 60.

Referring to FIG. 15, the refrigeration cycle 60 may include a circulation path 66 along which a refrigerant circulates, and an evaporator 67 configured to heat and evaporate the refrigerant, a compressor 64 configured to compress the refrigerant received from the evaporator 67, a condenser core 30 configured to condense the refrigerant discharged from the compressor 64, a storage tank 10 configured to store the refrigerant condensed by the condenser core 30, a pump 16 installed on a downstream side of the storage tank 10 to circulate the refrigerant, and the like may be installed in the circulation path 66.

Through such a configuration, the liquid phase refrigerant condensed by the condenser core 100 may be stored in the storage tank 10, and the liquid phase refrigerant may be supplied to the evaporator 67 through a pumping operation of the pump 5.

According to the present disclosure, the capacity and the weight of the storage tank may be reduced by disposing the condenser in the interior of the storage tank, and through this, the required installation space of the condenser may be reduced.

Although embodiments of the present disclosure have been described above, the present disclosure is not limited to the embodiments disclosed in the specification and the accompanying drawings, and the present disclosure may be variously modified by those skilled in the art without departing from the technical spirit of the present disclosure.

What is claimed is:

1. A storage tank including a condenser, comprising:
   a tank body having a storage space for storing a liquid phase working fluid; and
   a condenser core disposed in an interior of the tank body,
   wherein the tank body includes an upper body and a lower body,
   wherein a support plate is horizontally arranged within the upper body,
   wherein the condenser core includes a plurality of core elements,
   wherein each of the plurality of core elements includes an upper end coupled to the upper body, a lower end coupled to the support plate, and a rear end coupled to a support member, and
   wherein the support member extends to cross the upper body in a transverse direction of the upper body.

2. The storage tank of claim 1, wherein the condenser core is installed in an upper area of the storage space of the tank body.

3. The storage tank of claim 2, wherein the support plate for supporting the condenser core is disposed in the storage space of the tank body.

4. The storage tank of claim 1, wherein a water level sensor for detecting a water level is disposed in the tank body.

5. A storage tank including a condenser, comprising:
   a tank body having a storage space for storing a liquid working fluid;
   a header disposed in the tank body; and
   a condenser core connected to the header and disposed in an interior of the tank body,
   wherein the tank body includes an upper body and a lower body,
   wherein a support plate is horizontally arranged within the upper body,
   wherein the condenser core includes a plurality of core elements,
   wherein each of the core elements includes an upper end coupled to the upper body, a lower end coupled to the support plate, and a rear end coupled to a support member, and
   wherein the support member extends to cross the upper body in a transverse direction of the upper body.

6. The storage tank of claim 5, wherein each of the core elements has a coolant passage through which a coolant circulates,
   wherein the core elements are spaced apart from each other at a specific interval such that working fluid passages are formed between adjacent, or sequential, core elements.

7. The storage tank of claim 6, wherein the header includes:
   a coolant inlet manifold connected to inlets of the coolant passages of the core elements for communicating with the coolant passages of the core elements;
   a coolant outlet manifold connected to outlets of the coolant passages of the core elements for communicating with the coolant passages of the core elements; and
   a working fluid inlet manifold connected to the working fluid passages for communicating with the working fluid passages.

8. The storage tank of claim 6, wherein each of the core elements includes a pair of opposing half shells, and
   wherein each of the half shells has a groove forming one of the corresponding coolant passages.

9. The storage tank of claim 5, wherein the tank body includes an opening through which the condenser core is inserted into the tank body.

10. The storage tank of claim 9, wherein the header closes the opening of the tank body to effectively seal the opening.

11. The storage tank of claim 7, wherein a working fluid distribution chamber is formed in the interior of the working fluid inlet manifold, and the working fluid distribution chamber communicates with the working fluid passages.

12. The storage tank of claim 11, wherein the header includes a plurality of communication apertures for communicating with the working fluid distribution chamber, and the communication apertures individually communicate with the working fluid passages.

13. The storage tank of claim 7, wherein a coolant inlet chamber is formed in the interior of the coolant inlet manifold, and the coolant inlet chamber communicates with inlets of the core elements.

14. The storage tank of claim 7, wherein a coolant outlet chamber is formed in the interior of the coolant outlet manifold, and the coolant outlet chamber communicates with outlets of the core elements.

* * * * *